United States Patent
Colt et al.

(10) Patent No.: US 11,492,874 B2
(45) Date of Patent: Nov. 8, 2022

(54) WELL-BASED POTENTIAL ENERGY CONVERSION SYSTEMS AND METHODS

(71) Applicant: RENEWELL ENERGY, Houston, TX (US)

(72) Inventors: Walter Rowley Colt, Houston, TX (US); Anthony Kemp Gregory, Jr., Houston, TX (US); Stefan James Streckfus, San Francisco, CA (US)

(73) Assignee: RENEWELL ENERGY, Houston, TX (US)

( * ) Notice: Subject to any disclaimer, the term of this patent is extended or adjusted under 35 U.S.C. 154(b) by 0 days.

(21) Appl. No.: 17/523,143

(22) Filed: Nov. 10, 2021

(65) Prior Publication Data

US 2022/0065231 A1    Mar. 3, 2022

Related U.S. Application Data

(63) Continuation of application No. PCT/US2021/031250, filed on May 7, 2021.
(Continued)

(51) Int. Cl.
*E21B 41/00* (2006.01)
*F03G 3/00* (2006.01)
(Continued)

(52) U.S. Cl.
CPC .......... *E21B 41/0085* (2013.01); *F03G 3/094* (2021.08); *H02J 15/00* (2013.01); *E21B 47/04* (2013.01); *Y10T 137/5983* (2015.04)

(58) Field of Classification Search
CPC ...... E21B 41/0085; E21B 47/04; E21B 47/10; F03B 3/094; H02J 15/00; Y10T 137/5983
See application file for complete search history.

(56) References Cited

U.S. PATENT DOCUMENTS

| | | | |
|---|---|---|---|
| 4,210,018 A | 7/1980 | Brieger | |
| 4,696,343 A | 9/1987 | Anderson et al. | |

(Continued)

FOREIGN PATENT DOCUMENTS

| | | |
|---|---|---|
| DE | 4135440 A1 | 4/1993 |
| EP | 1509678 A | 8/2005 |

(Continued)

OTHER PUBLICATIONS

International Search Report and Written Opinion for corresponding International Patent Application PCT/US2021/031250, dated Aug. 26, 2021.

(Continued)

*Primary Examiner* — Brad Harcourt
(74) *Attorney, Agent, or Firm* — Vorys, Sater, Seymour and Pease LLP

(57) ABSTRACT

Potential energy conversion systems include a movable mass suspended by a line in a non-producing well, the line being coupled to a motor operable to lift the movable mass, and a generator operable to produce electricity when lowering the movable mass. Energy conversion methods include providing the potential energy conversion system; and storing potential energy by raising the movable mass, or releasing potential energy and converting the potential energy to electricity by lowering the movable mass.

28 Claims, 15 Drawing Sheets

Related U.S. Application Data

(60) Provisional application No. 63/145,694, filed on Feb. 4, 2021, provisional application No. 63/145,663, filed on Feb. 4, 2021, provisional application No. 63/145,753, filed on Feb. 4, 2021, provisional application No. 63/023,024, filed on May 11, 2020.

(51) Int. Cl.
  H02J 15/00 (2006.01)
  E21B 47/04 (2012.01)

(56) References Cited

U.S. PATENT DOCUMENTS

| | | |
|---|---|---|
| 5,889,336 A | 3/1999 | Tateishi |
| 6,803,670 B2 | 10/2004 | Peloquin |
| 8,901,758 B1 | 12/2014 | Nix |
| 9,869,291 B2 | 1/2018 | Fiske |
| 10,683,851 B2 | 6/2020 | Pedretti et al. |
| 10,788,020 B2 | 9/2020 | Pedretti et al. |
| 10,830,216 B2 | 11/2020 | Pedretti et al. |
| 10,837,429 B2 | 11/2020 | Pedretti et al. |
| 10,935,005 B2 | 3/2021 | Bhargava |
| 2008/0142215 A1* | 6/2008 | Pabon ............ E21B 47/00 166/254.2 |
| 2009/0193808 A1 | 8/2009 | Fiske |
| 2011/0241356 A1 | 10/2011 | Khoshnevis |
| 2013/0270836 A1* | 10/2013 | Quraishy ............ F03G 3/00 185/32 |
| 2016/0003224 A1 | 1/2016 | McGrath |
| 2016/0084236 A1 | 3/2016 | Kellinger et al. |
| 2017/0077467 A1 | 3/2017 | Kronke et al. |
| 2017/0145782 A1* | 5/2017 | Ferg ............ E21B 47/00 |
| 2018/0216437 A1* | 8/2018 | Shafer ............ E21B 47/00 |

FOREIGN PATENT DOCUMENTS

| | | |
|---|---|---|
| GB | 2499007 A | 3/2012 |
| GB | 2506133 A | 3/2014 |
| GB | 2551177 A | 7/2016 |
| KR | 101396210 B1 | 5/2014 |
| WO | 2011123634 A2 | 10/2011 |
| WO | 2012034104 A1 | 3/2012 |
| WO | 2013005056 A1 | 1/2013 |
| WO | 2013124548 A1 | 8/2013 |
| WO | 2018134620 A2 | 7/2018 |
| WO | 2020260596 A1 | 12/2020 |

OTHER PUBLICATIONS

English translation of WO2013124548A1 retrieved from https://patentscope.wipo.int on Nov. 9, 2021.

English translation of KR101396210B1 retrieved from http://engpat.kipris.or.kr/engpat/search on Nov. 9, 2021.

English translation of DE4135440A1 retrieved from https://patentscope.wipo.int on Nov. 9, 2021.

* cited by examiner

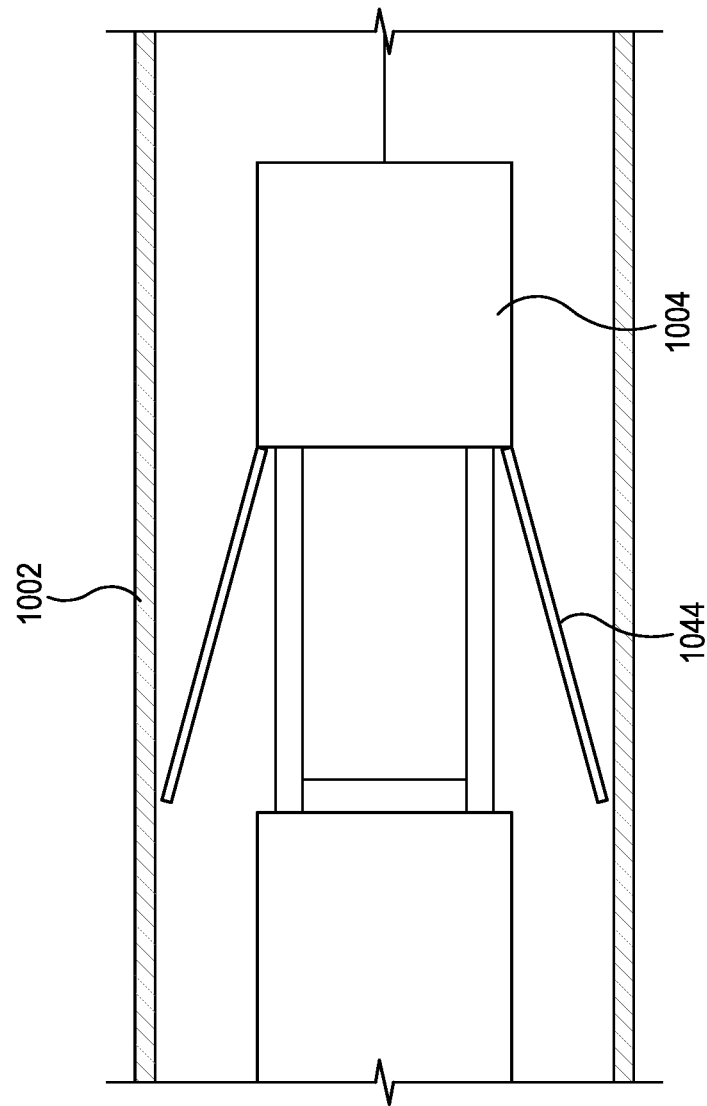

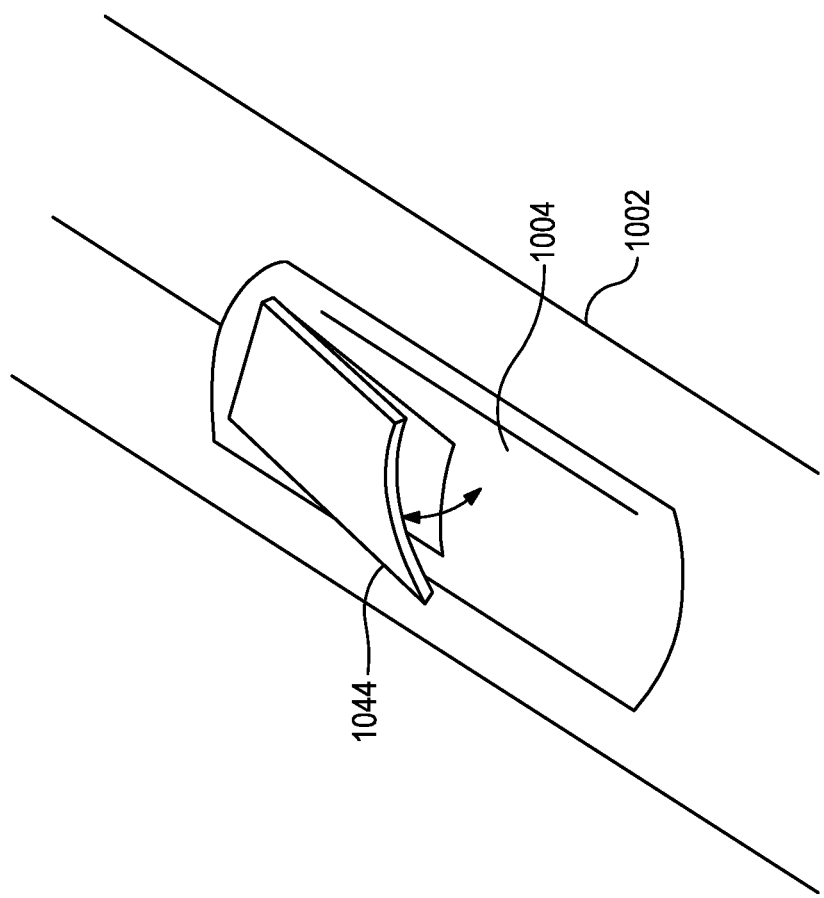
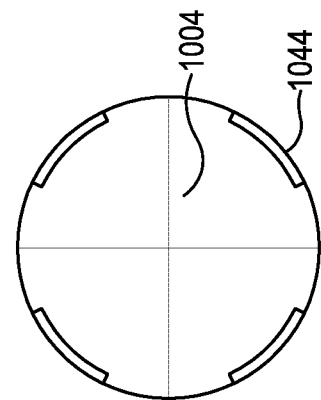
FIG. 10C
FIG. 10D

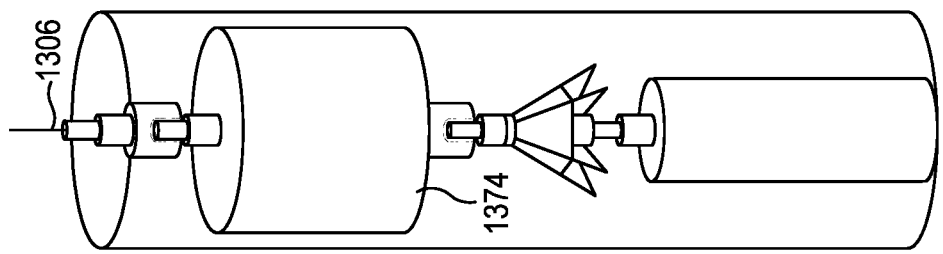
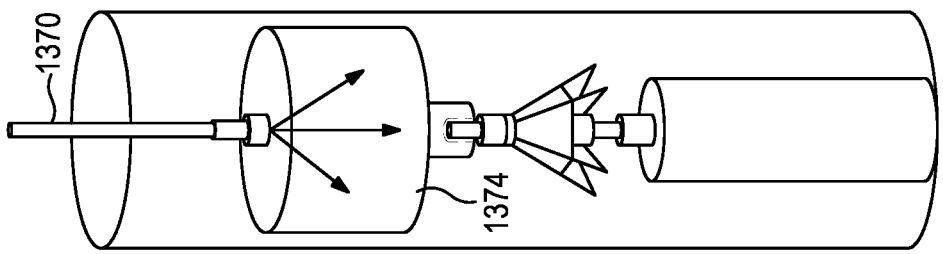
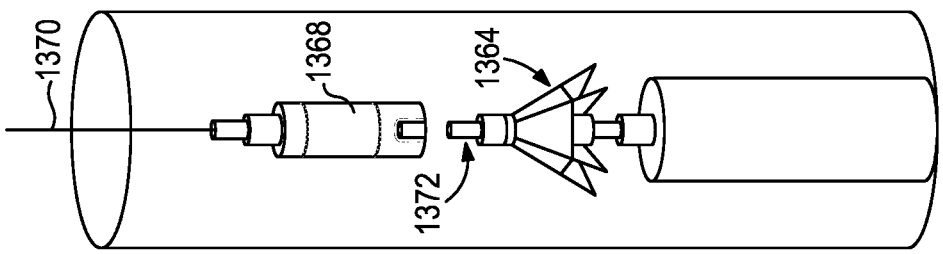
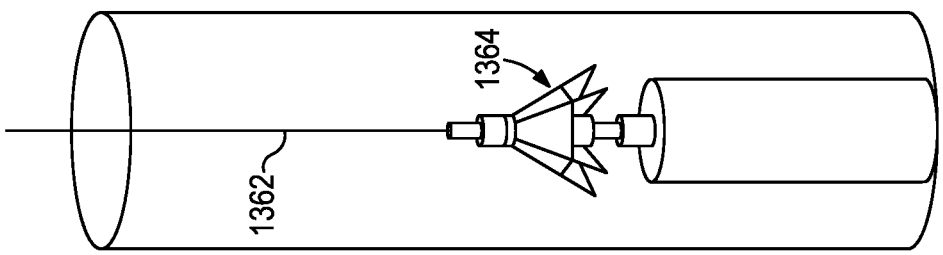
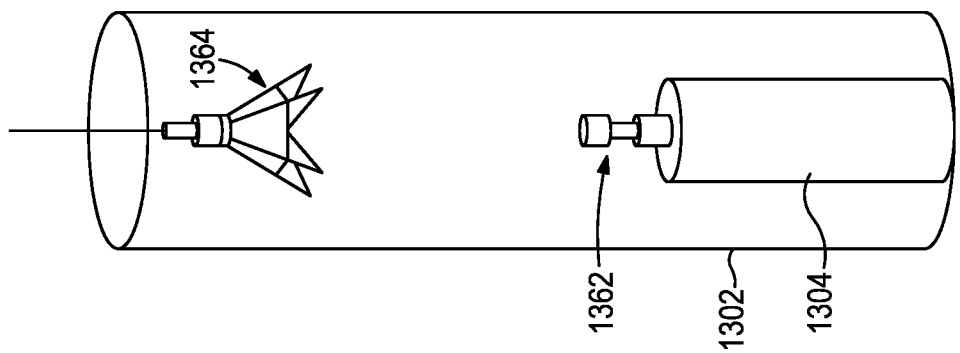

WELL-BASED POTENTIAL ENERGY CONVERSION SYSTEMS AND METHODS

FIELD

The present disclosure relates to potential energy conversion and, more particularly, systems and methods operable to produce electrical power through release of potential energy using a gravity-based system.

BACKGROUND

According to the U.S. Energy Information Administration, in 2019 the total energy generation from wind and solar resources was a collective 8% of all energy generated. Due to the intermittent nature of wind and solar power generation, these sources are unreliable for consistent power generation. By themselves, these power sources are unable to produce electricity in lockstep with demand, unlike other energy sources such as natural gas, nuclear, or coal power, which have fewer condition-based operational constraints. As a result, there has been growing demand for energy storage technologies to harness renewable and other intermittent energy sources in times of excess production capacity and release the stored energy when there is excess demand or production capacity is low.

Batteries and supercapacitors are increasing being used for storage of excess energy. However, these technologies may be expensive, particularly when employed for storage of massive amounts of electricity.

One approach that has been long-used for storing energy on a large scale utilizes a water reservoir for pumped-storage hydroelectricity ("Pumped Hydro"). In Pumped Hydro approaches, the potential energy of water is increased by pumping it into a reservoir at a first elevation and discharging it to a lower elevation through a series of turbines to produce electric power. Pumped Hydro approaches may operate efficiently, with the loss between energy input and recovered energy output below about 30% in most modern systems (i.e., greater than about 70% energy recovery). A main advantage of Pumped Hydro approaches is that little infrastructure may be needed, as natural features can provide the reservoir and elevation difference. However, to provide adequate energy storage, large volumes of water are typically required to account for the modest difference in elevation between the top of the reservoir and the power generation location at a lower elevation, typically no more than hundreds of feet and often less. Further, installation and operation of Pumped Hydro facilities are becoming increasingly hindered by environmental regulations, as the large volumes of water may be stored in previously dry areas and affect wildlife and local water flow. As a result, relatively few Pumped Hydro facilities have been installed in recent years.

Gravity-based potential energy storage is also a feasible approach for mitigating intermittent power generation. In such energy storage systems, a mass is suspended and electrical power is input to mechanically elevate the mass to a higher elevation when excess power is available. The stored potential energy is then converted back to electricity in response to demand by lowering the mass and driving a mechanical generator. Using modern winches and generators, gravity-based systems can achieve high storage efficiency, with losses often below about 20%. Gravity-based systems are often less susceptible to the environmental impact and government regulations associated with Pumped Hydro approaches, but may require installation and maintenance of expensive infrastructure. For example, gravity-based systems may require construction of a tower or pit to provide the difference in elevation for raising and lowering a suspended mass. As the elevation difference increases to afford more energy storage capacity, construction costs may increase as well. The combined effects of large initial capital expenditure and unsightly visual impacts can render gravity-based systems impractical and uneconomical in some cases. Suspension of increasingly larger masses may improve the storage potential, but this approach may face limits as well.

SUMMARY

The present disclosure generally relates to gravity-based potential energy conversion systems for storing and generating electrical power, including overall system design and methods of use.

In some aspects, potential energy conversion systems disclosed herein include a movable mass suspended by a line in a non-producing well, the line being coupled to a motor operable to lift the movable mass, and a generator operable to produce electricity when lowering the movable mass.

In other aspects, energy conversion methods include providing a potential energy conversion system of the present disclosure; and storing potential energy by raising the movable mass, or releasing potential energy and converting the potential energy to electricity by lowering the movable mass.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

FIGS. 10A-10D are various views of a portion of a potential energy conversion system incorporating a movable mass equipped with a mechanical arrestor for producing drag or friction for protecting a well plug.

FIGS. 13A-13E are various views of a recovery system for retrieving a movable mass from a well housing a potential energy conversion system.

DETAILED DESCRIPTION

Figure 1:
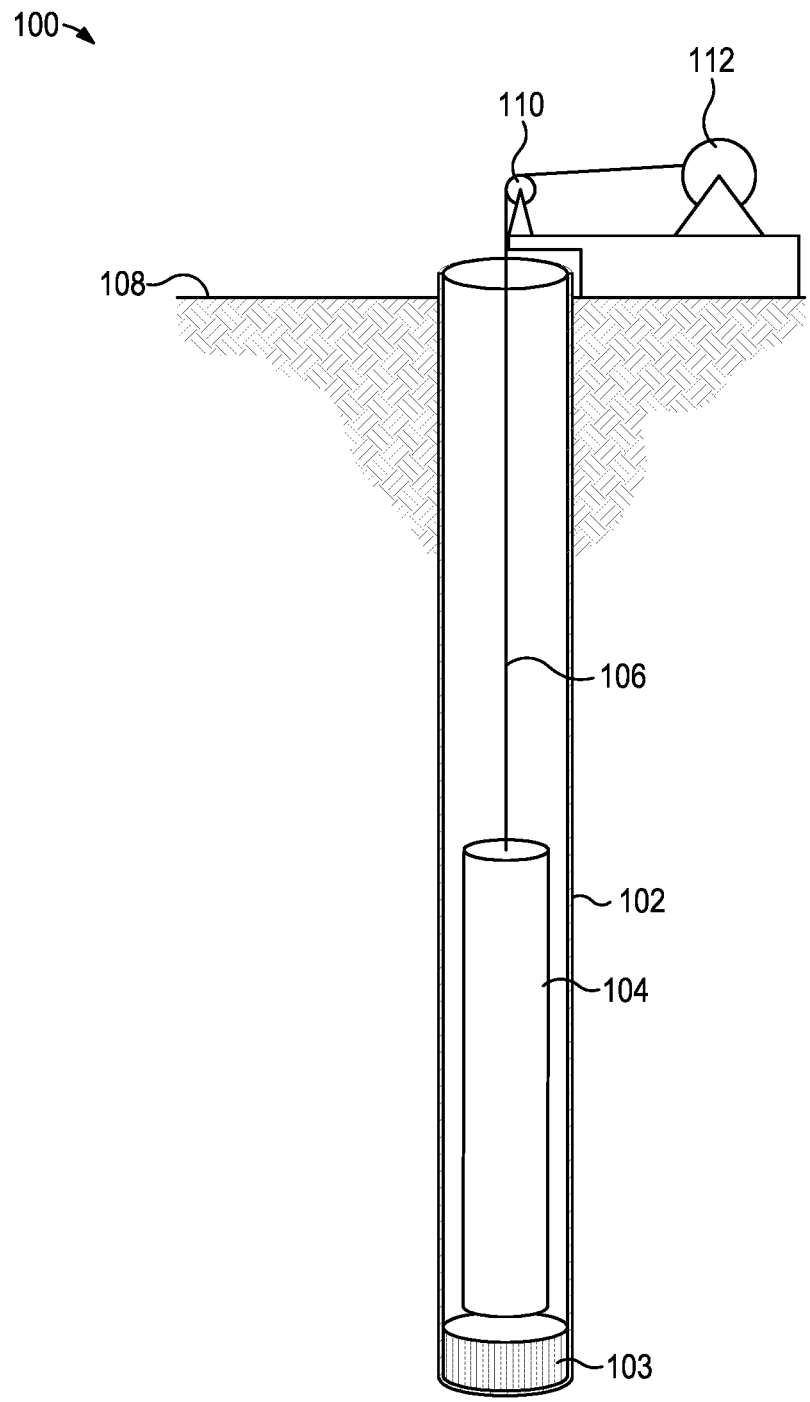
FIG. 1 is an illustration of a potential energy conversion system housed in a non-producing well in accordance with the present disclosure.

The present disclosure relates to potential energy conversion and, more particularly, systems and methods operable to produce electrical power through release of potential energy using a gravity-based system. As discussed above, excess energy produced from various power sources can be stored in the form of potential energy. However, there are limitations to Pumped Hydro and conventional gravity-based potential energy storage approaches.

The present disclosure provides energy storage approaches that maintain the advantages of gravity-based potential energy storage of excess energy produced from other sources, such as solar and wind energy sources, while also overcoming the challenges of providing large elevation changes to promote utilization of smaller masses. Namely, the present disclosure provides potential energy conversion systems that utilize existing infrastructure in the form of inactive (idle) and/or abandoned wellbores that are no longer producing a natural resource (e.g., a hydrocarbon resource or water) to house a suspended mass within their production casings for the purposes of storing and releasing potential energy as the movable mass travels up and down. Following drilling completions, wells may include a narrow casing extending thousands of feet into the earth (e.g., a nine-inch diameter casing extending up to 15000 or even further into the earth). The large vertical distance may be exploited in the present disclosure for providing a substantial elevation change of a suspended mass in gravity-based potential energy conversion systems disclosed herein.

Potential energy conversion systems housed in a non-producing well, as disclosed herein, may provide a number of advantages over existing potential energy conversion systems. One advantage is that the non-producing wells may be converted to afford potential energy storage with little additional infrastructure investment. The main infrastructure investment with a well is already borne by the entity who drilled the well to produce a natural resource therefrom. Thus, the potential energy conversion systems disclosed herein may utilize this existing infrastructure (which may be nearly worthless or even a financial liability) to add new value thereto. Advantageously, utilizing an abandoned, non-producing well may turn a nuisance asset into an environmentally friendly and social positive energy storage resource. According to Enverus, an online database which tracks oil and gas well information, there are about 1,380,000 inactive and unplugged wells across the United States alone, making up about 40% of all wells. As such, there is a large inventory of non-producing wells available for conversion into potential energy storage systems according to the disclosure herein.

The potential energy conversion systems disclosed herein may be applicable to both cased and uncased wells, as well as those that are plugged or unplugged. Plugged wells may be desirable due to their lower release rate for methane and other greenhouse gases in comparison to unplugged wells (up to 5000 times less leakage). At the very least, incorporating a potential energy conversion system into an unplugged well may lessen the overall environmental impact of the well by counterbalancing a portion of the impact of the greenhouse gases released therefrom. Even more desirably, retrofitting an unplugged, non-producing well for potential energy storage according to the disclosure herein may provide an economic impetus (incentive) for plugging the well during installation of the potential energy conversion system. Thus, a further advantage of the potential energy conversion systems disclosed herein includes a dual benefit in the reduction in methane leakage with an associated positive environmental impact through an increase in "green" energy storage capacity.

In addition to the advantages of repurposing an existing, non-producing well, the potential energy conversion systems may incorporate additional features that may facilitate providing potential energy storage within a wellbore environment. The conditions in a well may change over time, even in a plugged well (e.g., if the plug degrades or fails), regardless of whether a potential energy conversion system is present therein. The potential energy conversion systems of the present disclosure may incorporate sensors configured to monitor the wellbore environment (e.g., liquids and/or gases in the well). By monitoring conditions in the well, one may determine if the well itself has undergone a dynamic change or if the potential energy conversion system has caused a change in the well (e.g., by impacting a plug or casing therein). Moreover, the potential energy conversion systems may incorporate one or more failsafe devices to protect the plug in a plugged well should the suspended mass break free of a line tethering the mass to a generator upon the surface. The failsafe features may arrest the impact at the plug through various types of interactions discussed further herein. As a further option, the potential energy conversion systems may incorporate capabilities for recovering a mass that has become uncoupled in a well.

The terms "mass," "movable mass" and "suspended mass" may be used interchangeably herein.

Potential energy conversion systems of the present disclosure are gravity-based systems that operate by storing or releasing potential energy through vertical movement of a mass suspended within a well. The system may convert electricity to potential energy as the mass is raised, and the potential energy may be converted back to electricity as the mass is lowered. In non-limiting examples, the mass may be raised in times of excess energy production, and electricity may be generated when excess energy production capacity is needed. The amount of potential energy storable by the potential energy conversion systems, and the efficiency thereof, may be defined by a number of factors that include the depth and width of the well; the weight of the suspended mass; the presence of deviations, inclinations, or doglegs within the well; and the properties of the contents within the well (if any), such as fluid viscosity, fluid density, pressure, and the like.

The potential energy conversion systems may be incorporated within any well extending below the earth's surface. While the potential energy conversion systems may be located within a well of any depth, the well depth may more desirably be about 5000 feet or more, or about 10000 feet or more, or about 15000 feet or more, or about 20000 feet or more, or about 25000 feet or more. Exemplary ranges include depths within a range of about 5000 feet to about 25000 feet, or about 5000 feet to about 15000 feet, or about 1000 feet to about 10000 feet, or about 10000 feet to about 20000 feet. The mass may be located in a substantially vertical section of the well extending over these vertical distances, such as between a wellhead at the earth's surface and a plug located at a specified depth within the well. The plug may divide the well into upper and lower sections.

In addition to vertical distance traveled, the weight of the suspended mass is another variable that determines amount of potential energy that may be stored by the systems. Systems in which the suspended mass travels over a larger vertical distance may utilize a suspended mass having a lower weight to achieve a given amount of potential energy storage, and those in which the suspended mass travels over a shorter distances may utilize larger masses to provide a comparable amount of potential energy storage. Thus, for a potential energy storage system featuring a given vertical distance over which the suspended mass may travel, a mass of appropriate size may be chosen to provide a desired amount of potential energy storage (up to the failure point of a cable or similar holder suspending the mass). As such, any size mass may be utilized without departing from the present disclosure. In various embodiments, the mass may weigh about 10 metric tons to about 300 metric tons. Practical considerations for the mass selection may include the well diameter and the carrying capacity for mechanical components of the systems (e.g., support lines, winches, re-directs, and the like).

The physical size of the suspended mass in the wellbore may be determined by the wellbore diameter, the density of the material comprising the suspended mass, and the vertical distance over which the bottom of the suspended mass needs to move vertically to store or release a given amount of energy. The maximum amount of energy storable or releasable by/from the potential energy conversion systems is determined by the relationship E=mgh, where E is the stored/released energy, m is the mass, g is the gravitational acceleration constant (e.g., 9.8 m/s$^2$), and h is the maximum displacement (height) over which the suspended mass may move. Thus, the amount of energy storable/releasable is determined by the mass suspended in a given well, given that the maximum displacement may be fixed in a given well based on the vertical distance the suspended mass may move. If the suspended mass is of insufficient size to store/release a given amount of energy and cannot be made "longer" (extend a larger vertical distance within the well, possible recourses are to increase the diameter of the mass by making the mass extend closer to the walls of the well (e.g., nearer the casing in a cased section of the well) and/or increase the density of the material comprising the suspended mass.

The well in which the potential energy conversion system is located may have substantially the same diameter in a substantially vertical upper section extending from the earth's surface to a plug in the well or between the earth's surface and the well bottoms. Alternately, the well in which the potential energy conversion system is located may have a non-uniform diameter between the earth's surface and a plug or the well bottoms. For example, in embodiments, the well may taper and/or undergo stepwise graduations from a larger diameter to a smaller diameter at the plug or the well bottoms. In non-limiting examples, the well may have a minimum diameter of about 4 inches, or about 6 inches, or about 8 inches, or about 10 inches, or about 12 inches at a narrowest location within the well, which may be present in a well having a uniform or non-uniform diameter. These distances may represent the distance between the subterranean formation upon opposite sides of an uncased well or between the surface of a casing upon opposite sides of a cased well.

The diameter of the suspended mass may have a maximum diameter that is slightly less than the minimum diameter of the well. The space between the suspended mass and the walls of the well or the casing is referred to as the annulus. In non-limiting embodiments, the annulus between the walls of the well or the casing and the suspended mass may be about 6 inches or less, or about 4 inches or less, or about 3 inches or less, or about 2 inches or less, or about 1 inch or less, or about 0.9 inches or less, or about 0.8 inches or less, or about 0.7 inches or less, or about 0.6 inches or less, or about 0.5 inches or less, or about 0.4 inches or less, or about 0.3 inches or less, or about 0.2 inches or less, or about 0.1 inches or less. In various embodiments, the annulus between the suspended mass and the walls of the well or the casing may range from about 0.1 inches to about 1 inch, or about 1 inch to about 3 inches, or about 0.3 inches to about 0.8 inches, or about 0.2 inches to about 0.5 inches, or about 0.5 inches to about 1.0 inches. A given annulus size may be chosen to afford a size of the suspended mass sufficient to store or release a specified amount of energy.

The suspended mass may fill a substantial volume of the available volume within a well, such as about 20% or more of the well volume, or about 30% or more of the well volume, or about 40% or more of the well volume, or about 50% or more of the well volume, or about 60% or more of the well volume, or about 70% or more of the well volume, or about 80% or more of the well volume. A maximum volume occupied by the suspended mass may be dictated by the vertical distance over which the suspended mass needs to move when storing or releasing potential energy. In non-limiting embodiments, the maximum volume occupied by the suspended mass may be about 95% or less of the well volume, or about 90% or less of the well volume, or about 85% or less of the well volume, or about 80% or less of the well volume, or about 75% or less of the well volume, or about 70% or less of the well volume, or about 65% or less of the well volume, or about 60% or less of the well volume, or about 55% or less of the well volume, or about 50% or less of the well volume, or about 45% or less of the well volume, or about 40% or less of the well volume, or about 35% or less of the well volume, or about 30% or less of the well volume, or about 25% or less of the well volume, or about 20% or less of the well volume, or about 15% or less of the well volume, or about 10% or less of the well volume, or about 5% or less of the well volume.

The suspended mass may be elongate to fit effectively within the well and have a length of up to about 1000 feet, or up to about 2000 feet, or up to about 3000 feet, or up to about 4000 feet, or up to about 5000 feet, or up to about 6000 feet, or up to about 7000 feet, or up to about 8000 feet, or up to about 9000 feet, or up to about 10000 feet, or up to about 11000 feet, or up to about 12000 feet, or up to about 13000 feet, or up to about 14000 feet, or up to about 15000 feet, or up to about 16000 feet, or up to about 17000 feet, or up to about 18000 feet, or up to about 19000 feet, or up to about 20000 feet. To facilitate introduction to the well, the suspended mass may be inserted modularly in smaller sections to the well. Potential energy conversion systems disclosed herein may be installed within a non-producing well, typically after the well has finished its service lifetime for extracting a resource from a subterranean formation. The well may be uncased or cased (completed), and may be capped or uncapped. Uncapped wells may be capped during installation of the potential energy conversion systems disclosed herein, thereby addressing both potential energy storage and environmental releases from the uncapped well. In a first step, an uncapped hydrocarbon well may be selected, preferably a well completed with a production casing extending from the surface down to an oil bearing formation. Completed wells typically include one or more intervals having perforations about the diameter of the casing to allow the ingress of hydrocarbons from a hydrocarbon-bearing rock (subterranean formation). During installation of the potential energy conversion systems, a plug may be inserted above the perforations, such as a cement plug, packer, or other zonal isolation equipment that closes off the cased interval from ingress of hydrocarbons and other connate fluids into a section of the wellbore above the plug. A suitable plug may be chosen based upon the well conditions and regulatory requirements where the well is located. The well may be cleaned of hydrocarbons and left void, filled with an inert gas such as nitrogen or argon, or at least partially filled with a fluid. Fluids that may be installed in the well include, for example, aqueous fluids, including any cased well compatible aqueous fluids known in the art of wellbore drilling and production. Suitable fluids may include one or more additives, including additives to minimize corrosion and/or modify various rheological properties. For example, a suitable fluid may be include additives such as nanosodium silicate at a concentration in a parts per million range (ppm, e.g., up to about 100 ppm) to coat steel components of the potential energy conversion systems against corrosion, reduce friction between guide and steel, and to otherwise reduce overall drag as a suspended mass moved up and down. In another example, a fluid in the well may include high-density brines or chemicals to maintain hydrostatic pressure to minimize well casing damage and limit inadvertent ingress of hydrocarbons into the wellbore section where the suspended mass resides. In non-limiting examples, the fluid in the well may include one or more of biocides, anti-corrosion chemicals, and scale inhibitors to prevent damage to the potential energy conversion systems during extended deployment in the well.

FIG. 1 is an illustration of a potential energy conversion system 100 housed in a non-producing well 102 in accordance with the present disclosure. A movable mass 104 is suspended in well 102 and travels within a cased interval of a well 102 extending between the surface 108 and a plug 103 placed at some depth (e.g., thousands of feet) in the well 102. Plug 103 may isolate an upper section of well 103 from a lower section, with mass 104 being located in the upper section. Movable mass 104 may include any object of suitable weight dimensioned for emplacement and movement within well 102. In one example, movable mass 104 may be created from steel tubing that is filled with iron ore pellets and fluid to increase the weight and/or density. Movable mass 104 may also include one or more dense metals (e.g., tantalum or tungsten) and/or high-density fillers, such as depleted uranium, cement, sand, and the like. Movable mass 104 is suspended by a line 106, such as, but not limited to, a cable, wire rope, chain, synthetic rope, or the like. Line 106 connects the movable mass 104 to an electric motor capable of raising and lowering the movable mass 104 during operation, such as winch 112. The connection between movable mass 104 and winch 112 may include one or more sheave pulleys 110 or similar mechanical components that re-direct the force on line 106 as needed. The suspension components, including support line 106, winch 112, and sheave pulleys 110 may also incorporate a number of swivels or other protection devices in-line that prevent damage to support line 106 such as from twisting, binding, abrading, and the like.

Winch 112 may be a regenerative winch that can expend power by spooling up the line 106 to elevate the movable mass 104, and also generate electricity when operated in reverse as the line 106 is extended to lower movable mass 104 downward under the influence of gravity. Regenerative winches suitable for use in potential energy conversion systems may supply electricity as needed (e.g., to the electrical grid), or may be configured to transfer electricity to another storage medium, such as a battery or supercapacitor.

Alternately, winch 112 may be a standard winch that operates to raise the movable mass 102, while a separate generator (not shown) is mechanically connected to movable mass 104 to generate electricity as movable mass 104 is lowered within the well 102. Line 102 may be decoupled between winch 112 and a separate generator to provide raising or lowering capabilities as needed, or a second line 106 may be coupled to the separate generator. For example, a winch 112 and separate generator may be deployed such that the winch 112 drives a spool when elevating the mass 104 and the generator (not pictured) is driven when lowering the mass 104 through gears or other means of interfacing with the spool, such that each task can be performed separately and, if necessary, optimized for efficiency consideration of winching or power generation. It is also within the scope of this disclosure that multiple winches 112 may be used to control one or more movable masses 104, where at least one of the multiple winches 112 are regenerative winches. Further, while system 100 is shown with sheave pulleys 110 and winch 112, other suitable mechanical devices or electric motors may be used interchangeably including the use of a hoist, crane, or other suitable lifting device.

The movable mass 104 may be centered in the well 102 using a series of centralizers (not shown) along the length of the movable mass 104. Centralizers suitable for stabilizing movable mass 104 may be designed such that only incidental contact occurs as the movable mass 104 transits vertically within the well 102. Centralizers may also serve to mitigate casing wear by providing a sacrificial surface (a softer material than the well walls, for example) and by minimizing friction through other methods such as the shape of centralizer, and material selection for coefficients of friction with casing material or fluid in wellbore. By reducing friction in the potential energy conversion systems (100, etc.), centralizers may also improve energy efficiency and round-trip efficiency, thereby mitigating energy loss by decreasing casing-to-weight surface friction, viscous drag, and resistive pressure force through shape and material selection. The diameter of the centralizers may vary depending on the application, and may be gauged to account features within the well, such as overall diameter of the casing in the well 102, bends and deviations within the well 102, and other factors familiar to those in the art of emplacement of wellbore tools. Centralizers installed on movable mass 104 may be made from any suitable material for use in oil well centralizers, including ultrahigh molecular weight polyethylene, for example.

Accordingly, various embodiments of potential energy conversion systems disclosed herein may comprise: a movable mass suspended by a line in a non-producing well, in which the line is coupled to a motor operable to lift the movable mass, and a generator operable to produce electricity when lowering the movable mass (e.g., under the influence of gravity). During operation, the potential energy conversion systems may store potential energy by raising the movable mass, or release potential energy and converting the potential energy to electricity by lowering the movable mass.

The potential energy conversion systems disclosed herein may also incorporate monitoring capabilities (e.g., a monitoring sub-system incorporating one or more sensors) operative to measure environmental variables within the well such as liquid or gas pressure, gas composition, fluid level, and fluid composition, including changes therein. Relevant fluid or gas properties that may be monitored include one or more of fluid column height, pressure, density, redox potential, viscosity, hydrocarbon (fluid and gas) concentration and pressure (e.g., methane concentration and pressure), total dissolved solids, saline concentration, the like and any combination thereof. Operation of the potential energy conversion systems may impact or be impacted by one or more of these fluid or gas properties. By appropriately monitoring these properties, an operator may be alerted to a potentially adverse well condition, change the operating parameters associated with the potential energy conversion systems, address an incorrect operating condition of the potential energy conversion systems causing an undesired fluid or gas property, or any combination thereof, as explained in further detail hereinafter.

Monitoring sub-systems associated with the potential energy conversion systems may be useful for alerting changes in well conditions that may be indicative of various system failure modes, including fluid loss, fluid intrusion, deterioration of the wellbore casing, failure of system components within the well, and the like. Monitoring the conditions within the well may ensure an interval containing the potential energy conversion systems remain sealed and inaccessible to fluids intruding through the casing, for example, while also ensuring other appropriate operating conditions are maintained (e.g., pressure, fluid level, fluid composition, and the like) and mitigating emergent risks.

Monitoring sub-systems of various types may be utilized in the disclosure herein, either alone or in combination. When multiple monitoring sub-systems are employed, the individual sub-systems may monitor the same variables as a redundant safety measure and/or may measure different variables. Various aspects of the monitoring sub-systems are described hereinafter in reference to FIGS. 2-6. The potential energy conversion systems in FIGS. 2-6 are similar to those depicted in FIG. 1 and may be better understood by reference thereto.

Figure 2:
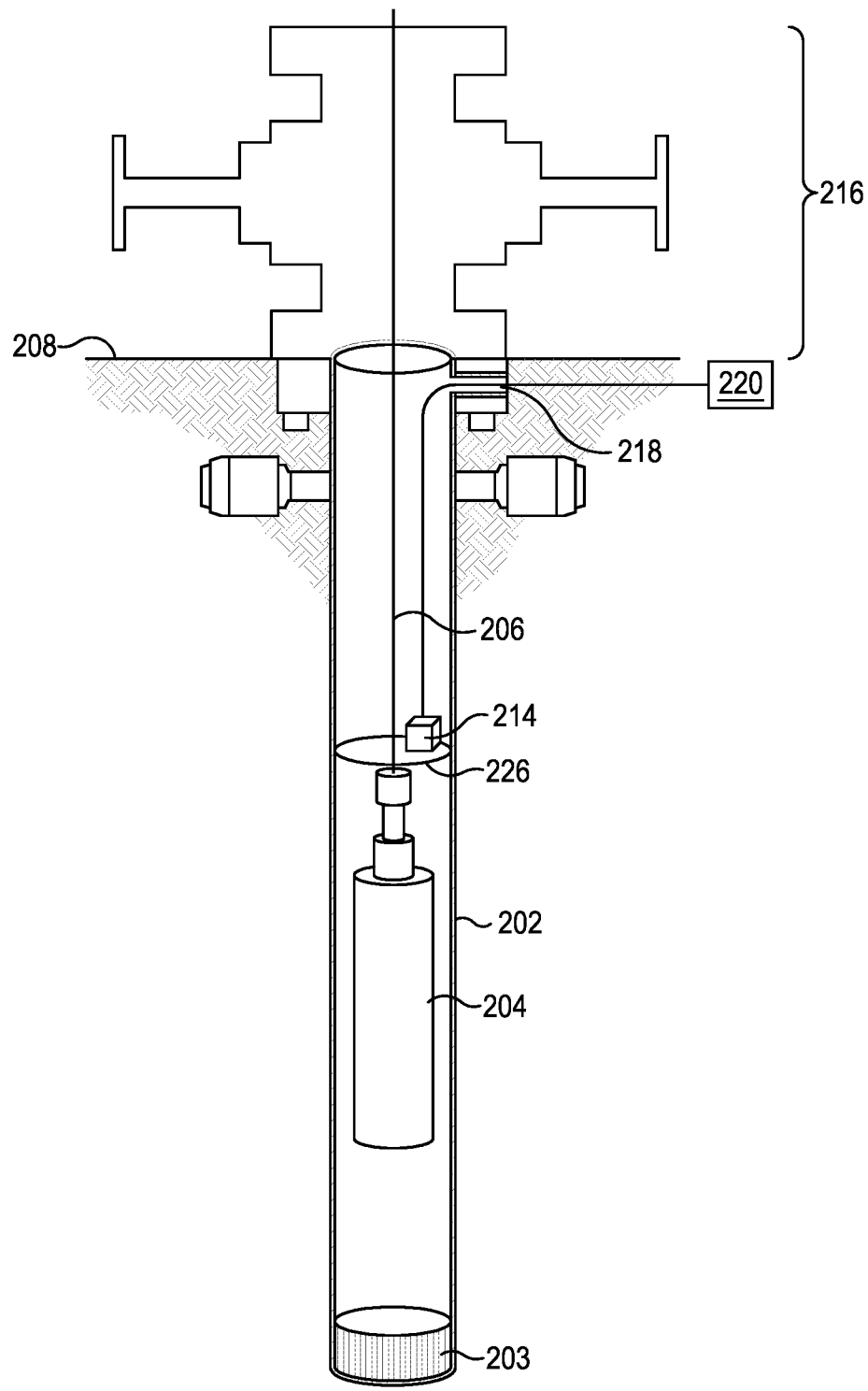
FIG. 2 is an illustration of a potential energy conversion system incorporating a buoy for monitoring conditions within a well.

FIG. 2 is an illustration of a potential energy conversion system 200 incorporating a buoy 214 (float) for monitoring conditions within a well. As shown in FIG. 2, potential energy conversion system 200 is installed within well 202, and includes movable mass 204 suspended by line 206 above plug 203. At the earth's surface 208, an entry of well 202 is secured by wellhead 216, which includes a blowout preventer as depicted. Buoy 214 rests upon the surface 226 of a fluid present within the well 202. A sensor associated with buoy 214 may monitor one or more environmental variables, such as the height of the surface 226 relative to wellhead 216, one or more fluid or gas properties, or other environmental conditions within well 202. Buoy 214 may transmit to the earth's surface 208 through wellhead passthrough 218 to a monitoring module 220 that records one or more variables within the well 202. Buoy 214 may be connected to monitoring module 220 by a retractable line 219 in some embodiments, such that the line automatically retracts or extends depending on the level of surface 226 to avoid entanglement with the movable mass 204 and line 206. Retractable line 219 may provide a pathway for sending data back to monitoring module 220 outside of the well 202. Alternately, data may be sent wirelessly to monitoring module 220, in which case the retractable line 219 may be optionally omitted. Wireless transmission of data may include wireless transmission to a local or cloud computing device.

Figures 3A, 3B:
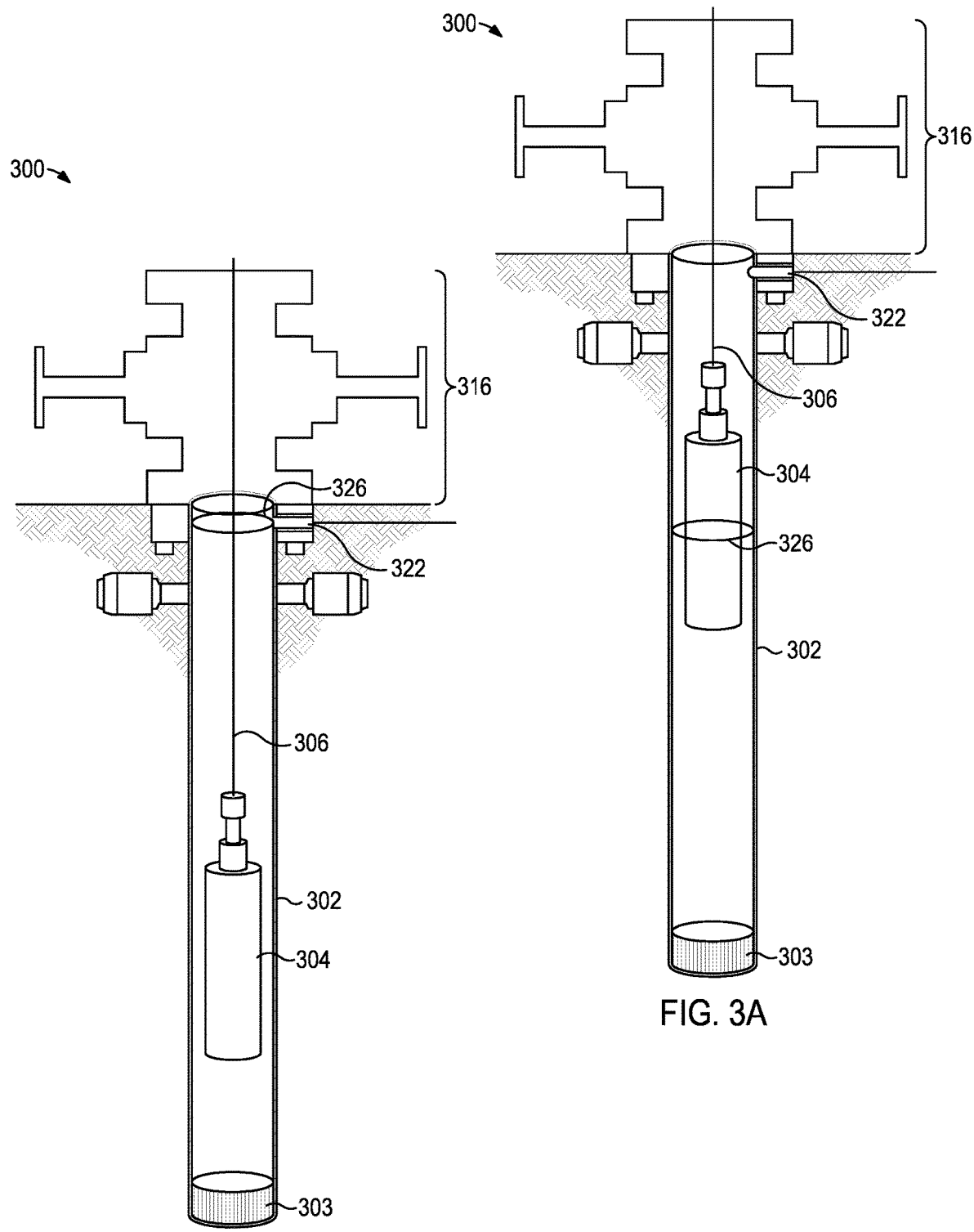
FIGS. 3A and 3B are various views of a potential energy conversion system incorporating a fluid trap for monitoring conditions within a well.

FIG. 3A is an illustration of a potential energy conversion system 300 incorporating a fluid trap 322 for monitoring conditions within a well. As shown in FIG. 3, potential energy conversion system 300 includes a movable mass 304 supported by line 306 suspended within an interval of well 302 between wellhead 316 and plug 303. In potential energy conversion system 300, a fluid trap 322 captures samples as the fluid surface 326 rises during operation (e.g., due to fluid displacement as movable mass 304 is lowered within well 302). The fluid trap 322 is dimensioned to capture a specified quantity of fluid needed to perform the desired measurements. In examples, fluid collection by fluid trap 322 may be performed each time or a portion of the times that the movable mass 304 is lowered into the well 302 during operation (e.g., once a day or some other set collection schedule). FIG. 3B shows an illustration of potential energy conversion system 300 after movable mass 304 has been lowered and fluid surface 326 has risen to the level of fluid trap 322.

Figure 4:
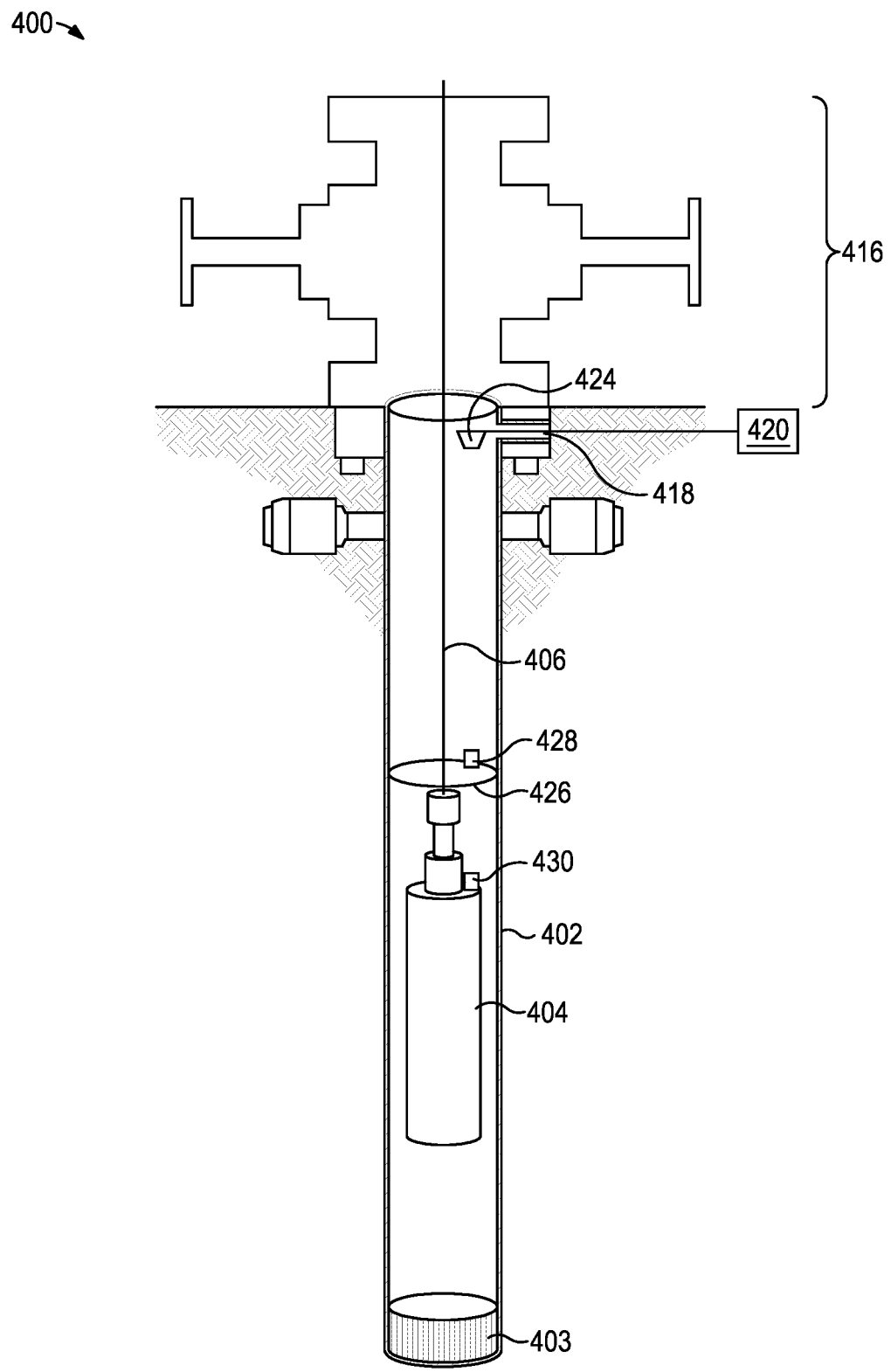
FIG. 4 is an illustration of a potential energy conversion system incorporating a laser or light for monitoring conditions within a well.

FIG. 4 is an illustration of a potential energy conversion system 400 incorporating a laser or light for monitoring conditions within a well. Potential energy conversion system 400 includes movable mass 404 supported by line 406 within an interval of well 402 defined between wellhead 416 and plug 403. In potential energy conversion system 400, the fluid level 426 and/or the position of movable mass 404 within the well 402 may be monitored using a range finder 424. Range finder 424 may include any suitable light-based or laser-based range finder or a Hall effect sensor. The range finder 424 may be used in conjunction with a target 428 located upon a buoy at the fluid surface 426 and/or a target 430 installed on the movable mass 404. Targets 428 and 430 may be independently a reflective surface (in the case of light-based or laser-based range finders 424) or a magnet (in the case of a Hall effect sensor). Data measured by range finder 424 may be transmitted by wire through wellhead passthrough 418 to a monitoring module 420. Alternately, data may be sent wirelessly to monitoring module 420. Wireless transmission of data may include wireless transmission to a local or cloud computing device.

Figure 5:
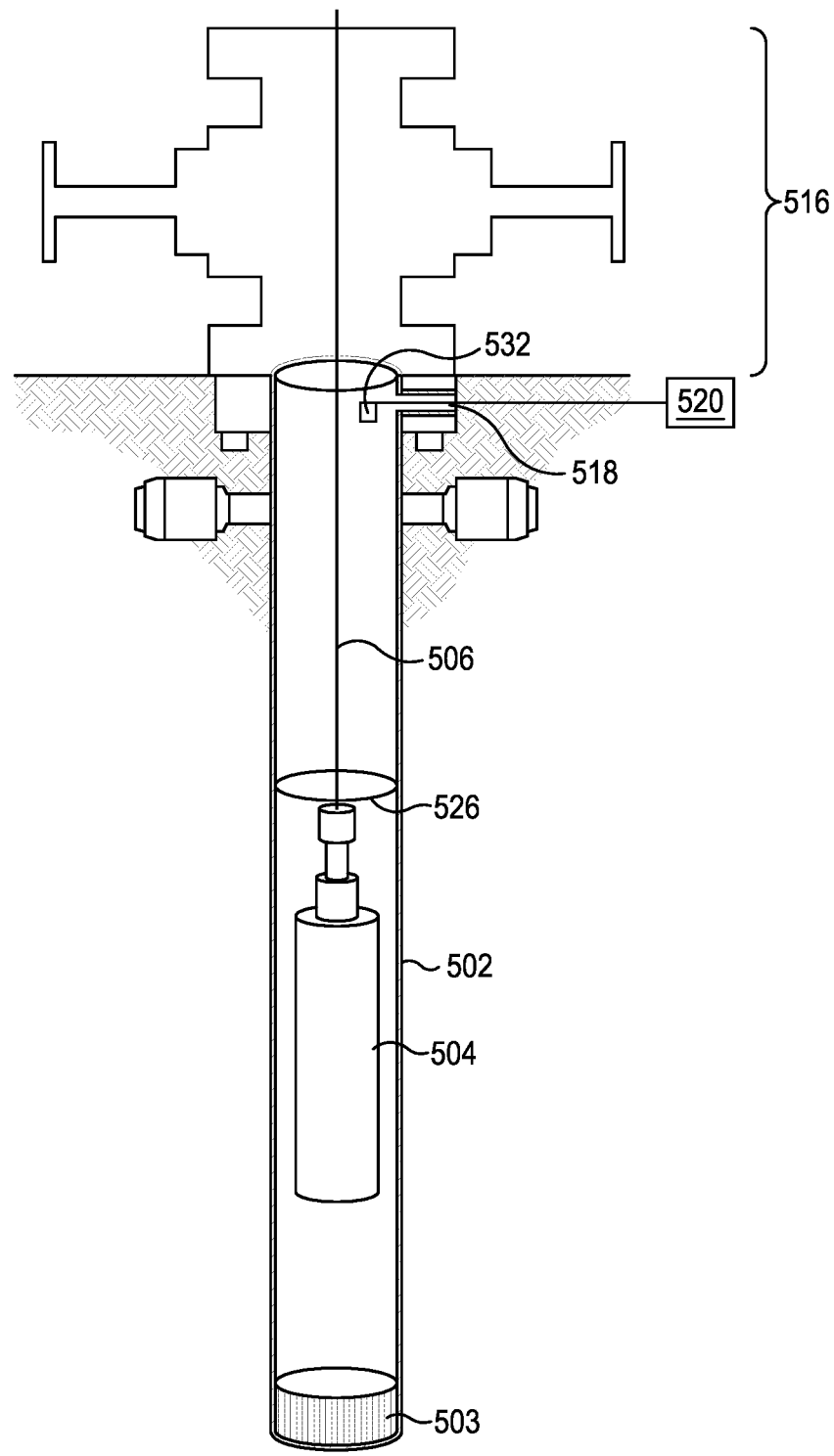
FIG. 5 is an illustration of a potential energy conversion system incorporating a pressure sensor for monitoring conditions within a well.

FIG. 5 is an illustration of a potential energy conversion system 500 incorporating a pressure sensor for monitoring conditions within a well. Potential energy conversion system 500 includes a movable mass 504 supported by line 506 within an interval of well 502 defined between wellhead 516 and plug 503. In this configuration, a pressure change in the air column above the fluid level 526 may be measured to determine the height of the fluid level 526 within the well 502. For example, in the event of a hole in the casing within well 502 and migration of gas or fluids into the well 502, a pressure transducer/piezometer 532 may be used to sample the air column for traces of methane or other hydrocarbon gases, which may be indicative of a casing leak. Data measured by pressure transducer 532 may be transmitted by wire through wellhead passthrough 518 to a monitoring module 520. Alternately, data may be sent wirelessly to monitoring module 520. Wireless transmission of data may include wireless transmission to a local or cloud computing device.

Figure 6:
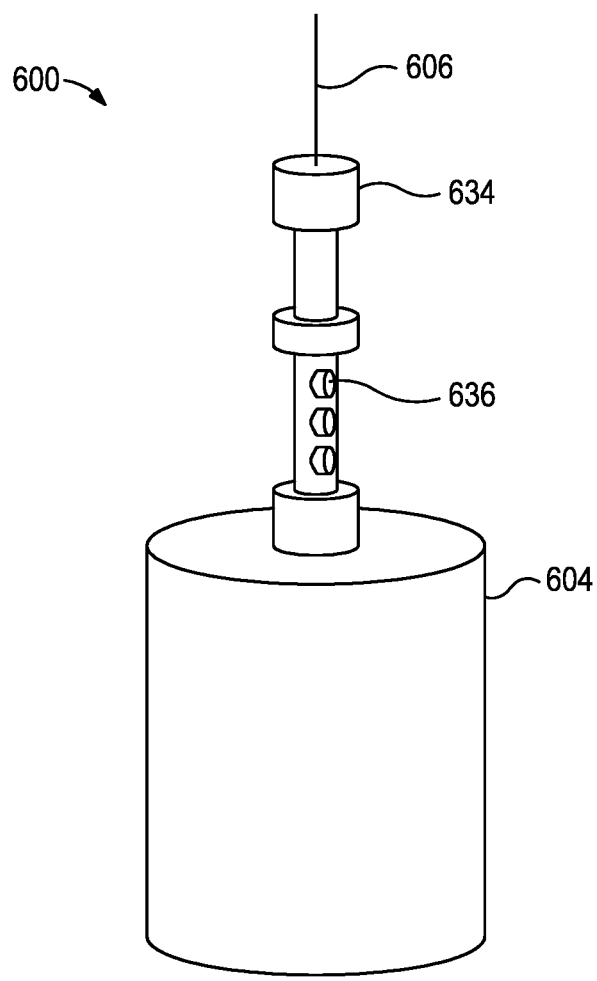
FIG. 6 is an illustration of a portion of a potential energy conversion system incorporating a fishing neck for monitoring conditions within a well.

FIG. 6 is an illustration of a potential energy conversion system incorporating a fishing neck 634 for monitoring conditions within a well. Monitoring system 600 may facilitate sampling at any fluid depth and includes a movable mass 604, which is supported by line 606, is configured with one or more sensing ports 636 that allow fluids to enter and contact various fluid monitoring devices (not shown). Sensing ports 636 may be integrated into the movable mass 604 at any location with fluid access. In the configuration depicted in FIG. 6, a fishing neck 634 (rope socket) connects movable mass 604 to line 606. Data measured can be transmitted to the earth's surface by transmission through a wire (not shown) integrated into line 606, or by wireless transmission to a relay outside the wellhead and casing. Monitoring system 600 may provide an added benefit of being able to precisely detect holes in the casing by correlating measured data with an associated depth of movable mass 604. For example, if there is a specific depth where fluid or gas intrusion is suspected, integrated sensors such as a flow meter may be able to pinpoint the location of the suspected leak. Similarly, a change in fluid composition detected by the integrated sensors may be indicative of the location of a leak.

Potential energy conversion systems disclosed herein may also include one or more failsafe devices that mitigate or minimize damage to system components such as the well casing, well plug, the movable mass and its associated suspension systems, and other mechanical components, including during detachment or loss of control of the movable mass. Failsafe devices may operate by slowing movement of the movable mass within the well and/or by reducing the impact of a falling mass on critical system components, such as a plug or other downhole fixtures isolating the system from the rest of the well. Failsafe devices may directly mitigate failure modes associated with the operation of the potential energy storage devices in a well, including plug damage, casing damage, containment failure, well blowouts, and the like.

Failsafe devices may provide risk mitigation based upon at least two failure modes: 1) a movable mass falling uninhibited within the well, such as during support line failure; or 2) inadvertent contact between a movable mass and the well plug during normal operation of the device. Failsafe devices may feature dissipation of momentum of a falling mass over a longer time to ensure that the well plug is not exceeded during impact and/or by absorbing kinetic energy at the site of the impact. Failsafe devices of various types may be utilized in the disclosure herein, either alone or in combination. When multiple failsafe devices are employed, the individual failsafe devices may be employed for redundant protection, if desired monitor the same variables as a redundant safety measure and/or may measure different variables. Various aspects of suitable failsafe devices are described hereinafter in reference to FIGS. 7-13E. Potential energy conversion systems utilized in FIGS. 7-13E are similar to those depicted in FIG. 1 and may be better understood by reference thereto.

Figure 7:
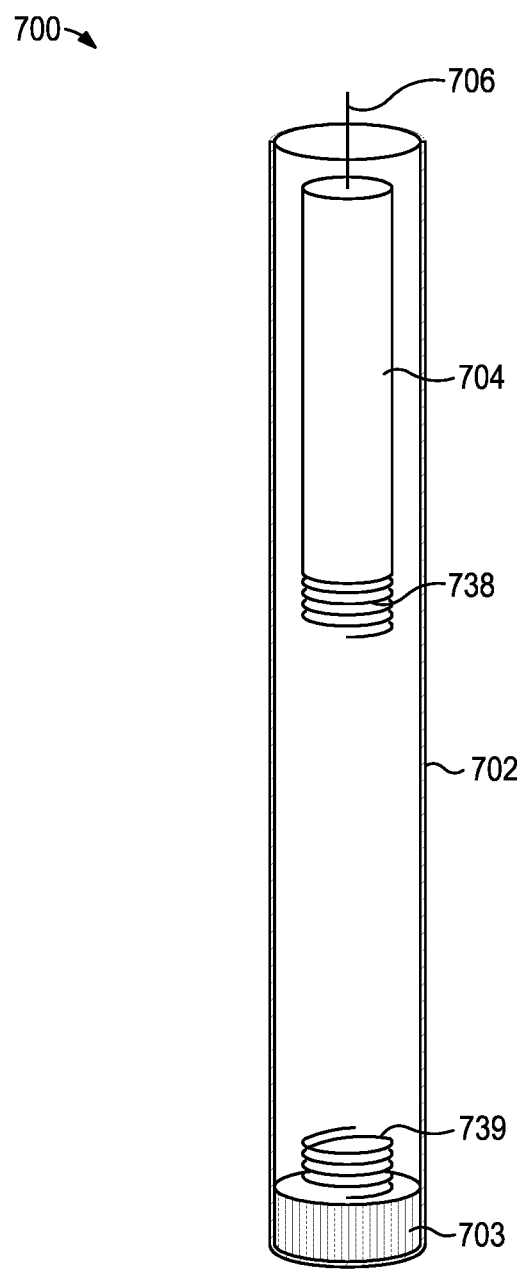
FIG. 7 is an illustration of a portion of a potential energy conversion system incorporating a failsafe device featuring one or more springs for protecting a well plug.

FIG. 7 is an illustration of a potential energy conversion system 700 incorporating a failsafe featuring one or more springs 738 and/or 739 for protecting a plug of a well housing the potential energy conversion system 700. Potential energy conversion system 700 includes a movable mass 704 supported by line 706 within an interval of well 702 that is sealed from a lower interval (section) by plug 703. Movable mass 704 is equipped with a spring 738 that functions as a failsafe device to protect plug 703 during an uncontrolled descent of movable mass 704, such as following breakage of line 706. Alternately or in addition, potential energy conversion system 700 may incorporate a spring 739 affixed to plug 703. Attachment of spring 738 to movable mass 704 and/or attachment of spring 739 to plug 703 may be accomplished by any suitable method such as welding, adhesive bonding, or submersion in cement (integrated into a cement plug, for example) depending on the material of movable mass 403 and/or plug 703.

Spring 738 and/or spring 739 may be a compression spring such as, but not limited to, a helical compression spring, conical spring, or solid (in the case of a rubber, for example), and may be made of a suitable material such as steel alloy, titanium, another metal, rubber, polyurethane, or the like. Spring 738 and/or spring 739 may independently vary in length depending on the size of the mass 704 and depth of the well 702. In one example, spring 738 and/or spring 739 may independently range from about 6 inches to about 3 feet in length, and may independently have a diameter between about 2 inches and about 8 inches, depending on the diameter of the well.

Figure 8:
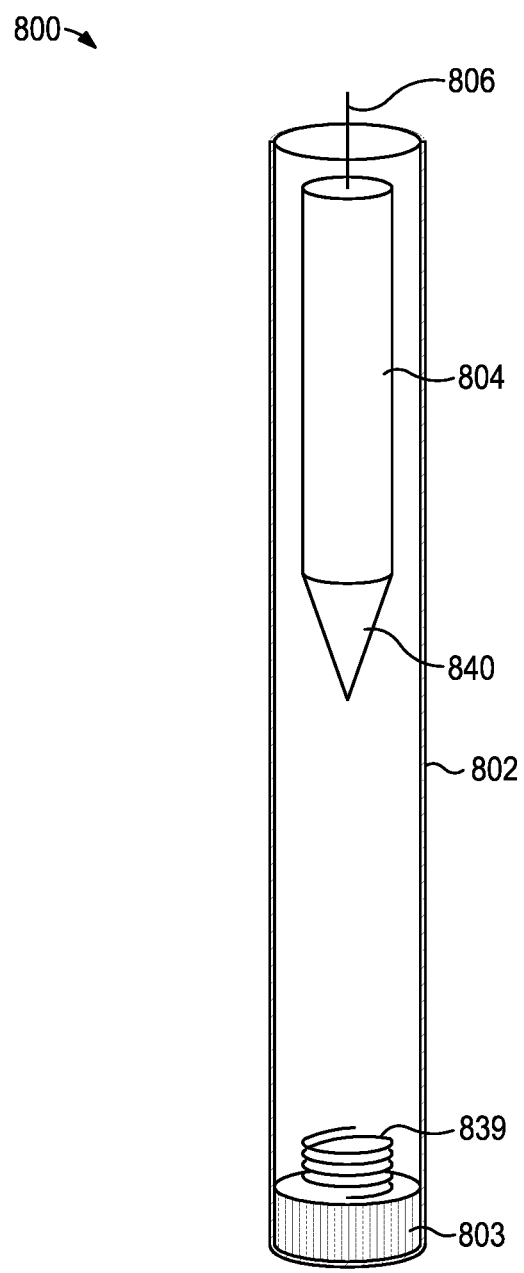
FIG. 8 is an illustration of a portion of a potential energy conversion system incorporating a failsafe device featuring a deformable structure for protecting a well plug.

FIG. 8 is an illustration of a potential energy conversion system 800 incorporating a failsafe featuring a deformable structure for protecting a plug of a well housing the potential energy conversion system. Potential energy conversion system 800 includes movable mass 804 supported by line 806 within an interval of well 802 that is sealed from a lower interval by plug 803. In this example, movable mass 804 includes a collapsible structure 840 (depicted as a cone in FIG. 8) affixed thereto that is selected and/or designed for failure mechanics that dissipate the energy of a falling mass when it contacts the plug 803 and/or walls of the well 802. For example, collapsible structure 840 may crumple or collapse upon impact with plug 803. Collapsible structure 840 may be combined with a spring 839 installed on plug 803 for further decreasing impact. Alternately, a second collapsible structure may replace spring 839 upon plug 803.

Collapsible structure 840 may function as a part of mass 804 by contributing mass or facilitating fluid flow around mass 804 during normal operation of potential energy conversion system 800. For the collapsible structure 840, the length of the collapsible structure 840 may vary according to the size (weight and diameter) of the mass 804, depth of the well 802, and the diameter of the well 802. Collapsible structure 840 may be formed from materials that collapse or deform predictably during impact, such as steel or rubber. Construction of collapsible structure 840 can include any suitable technique for forming the selected material, including stamping, lathing, and/or cutting/molding rubber or a similar collapsible material.

Figure 9:
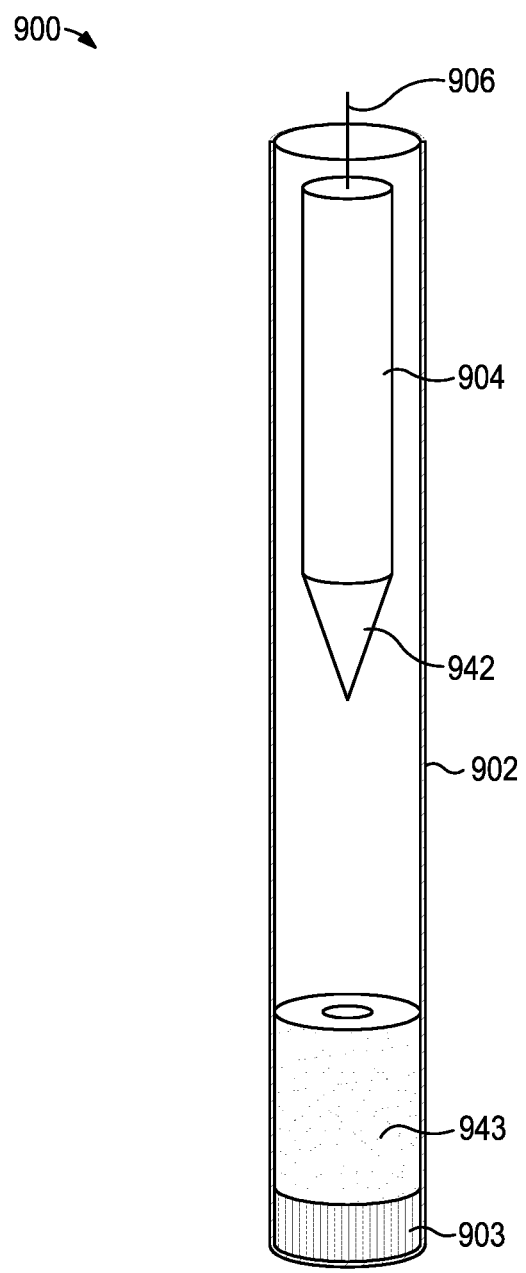
FIG. 9 is an illustration of a portion of a potential energy conversion system incorporating a failsafe device featuring one or more magnets for protecting a well plug.

FIG. 9 is an illustration of a system incorporating a failsafe featuring one or more magnets for protecting a plug of a well housing a potential energy conversion system. In the failsafe device configuration shown in FIG. 9, potential energy conversion system 900 includes a movable mass 904 supported by line 906 within an interval of well 902 that is sealed from a lower interval by plug 903. In this example, magnetic repulsion mitigates impact between movable mass 904 equipped with a magnet 942 and plug 903 equipped with a magnet 943. Magnets 942 and 943 are oriented such that like poles of magnets 942 and 943 repel one another as the distance between movable mass 904 and plug 903 decreases. In addition to mitigating impact, failsafe devices may also be used to calibrate (and recalibrate) the distance between movable mass 904 and plug 903, for example, to monitor the lift/lower distance of the system 900 during operation and to compensate for line stretch or inaccurate weight location by other techniques. In another example, movable mass 904 may include a sensor thereon for determining the distance between the bottom of movable mass 904 and plug 903 within well 900.

The amount of magnetic material present in magnets 942 and 943 may be selected by considering one or more of the holding pressure of the plug 903, the magnetic flux density, and the size of movable mass 904. Magnets 942 and 943 may feature any suitable shape including, but are not limited to, a solid cylinder, a hollow cylinder, or a pile of pellets ranging from about 6 inches to about 15 feet long. In some cases magnets 942 and 943 may be prepared from a permanently magnetic material such as neodymium or other rare earth magnetic material. Magnets 942 and/or 943 may also be collapsible in some cases.

Failsafe devices suitable for use in the disclosure herein may also utilize fluid resistance and/or friction to slow a mass during an uncontrolled fall, such as following a line break. Increasing fluid resistance may include expanding the outer diameter of the mass to contact the casing of the well or through the deployment of a structure (e.g, an airbag or parachute) to increase fluid drag.

Figure 10A:
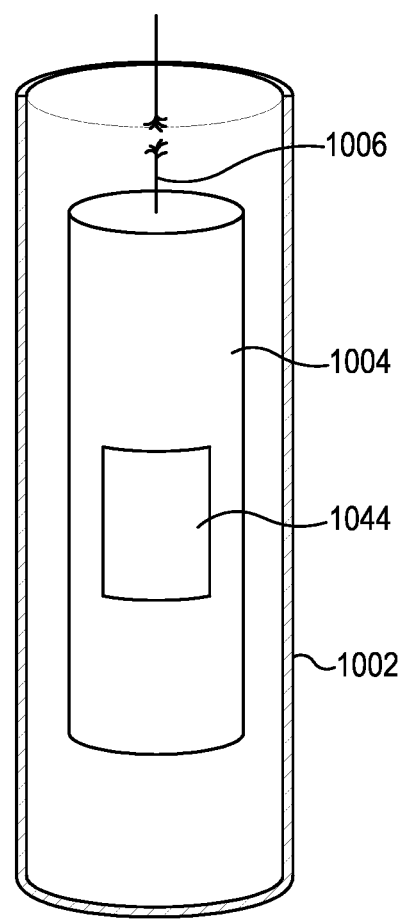

FIGS. 10A-10D are various views of a portion of a potential energy conversion system 1000 incorporating a mass equipped 1004 with a mechanical arrestor for producing drag for protecting a plug of a well housing a potential energy conversion system. In FIG. 10A, potential energy conversion system 1000 includes movable mass 1004 supported by line 1006 within an interval of well 1002. In this example, a flapper 1044 is installed on movable mass 1004 and may autonomously activate to increase the diameter of the movable mass 1004 during an uncontrolled fall. As shown in alternative views (FIGS. 10B and 10C), under sufficient fluid flow opposite the direction of movement of the movable mass 1004, the flapper 1044 may extend away from a longitudinal axis of the movable mass 1004, thereby increasing fluid drag and the decreasing descent velocity. Multiple flappers 1044 may be installed depending on the size of the movable mass 1004. For example, depending on the size of the movable mass 1004, a single pair of flappers 1044 (on opposite sides of movable mass 1004) may be sufficient to slow the movable mass 1004 during an uncontrolled descent. Alternately, multiple pairs of flappers 1044 may be installed around the perimeter of movable mass 1004. For example, as shown in FIG. 10D, four flappers 1044 may be installed around the perimeter of movable mass 1004. The flappers 1044 in this example are installed symmetrically in pairs to keep the movable mass 1004 as centered as possible during a descent. However, asymmetric arrangements of flappers 1044 are also within the scope of this disclosure.

Figure 11B:
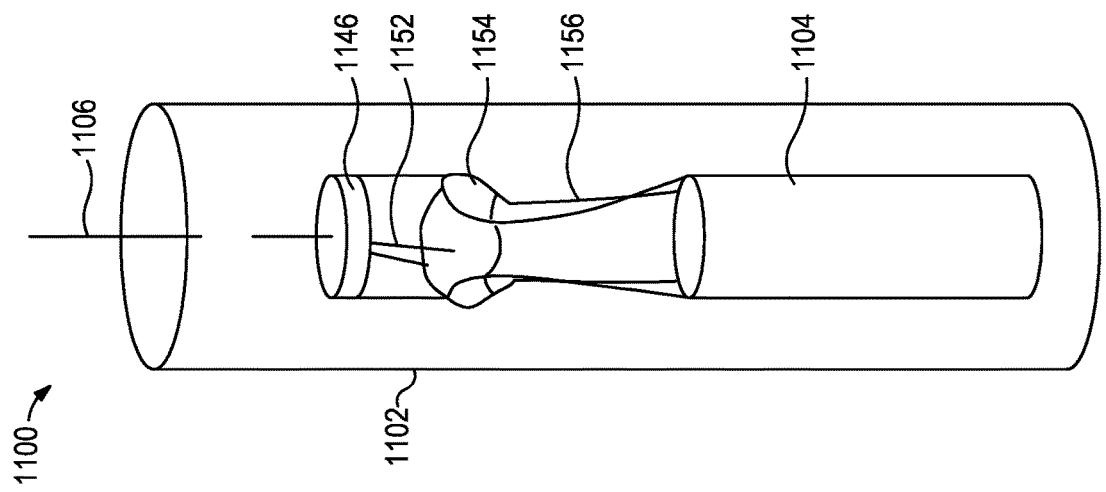
FIGS. 11A-11B are various views of a portion of a potential energy conversion system incorporating a movable mass equipped with a parachute for protecting a well plug.
Figure 11A:
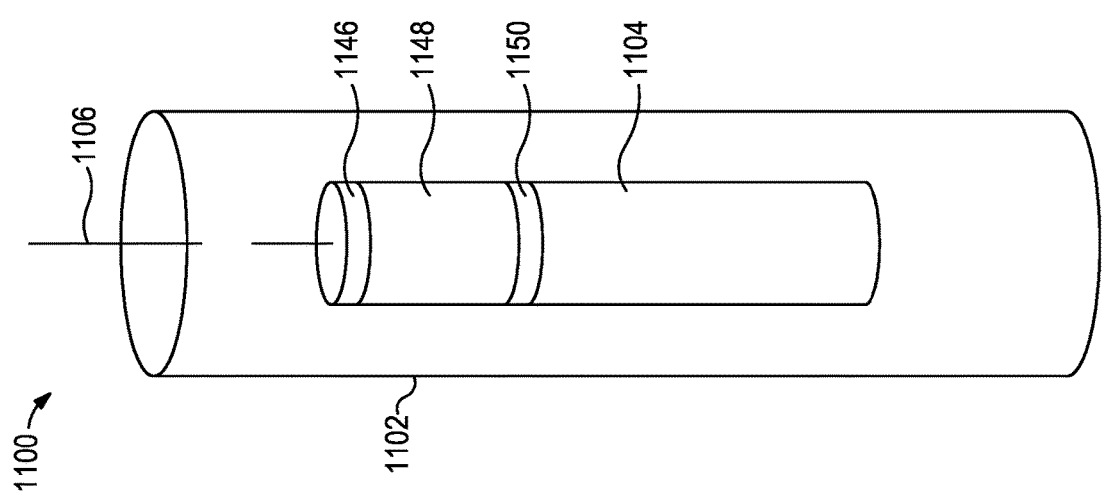

FIGS. 11A and 11B are various views of a portion of a potential energy conversion system 100 incorporating a movable mass equipped with a parachute for protecting a plug of a well. Potential energy conversion system 1100 includes movable mass 1104 supported by line 1106 within an interval of well 1102. In this example, a parachute-style apparatus 1154 is used to increase the diameter and fluid drag of movable mass 1104 during an uncontrolled fall. As shown in a non-deployed state in 11A, movable mass 1104 is equipped with a parachute housing 1148 and a cord housing 1150 for storage during routine operation. Connecting plate 1146 is affixed to parachute housing 1146, which is then used to secure the movable mass 1104 to line 1106. In the configuration shown in FIG. 11B, parachute 1154 has been deployed. Tension is applied from cords 1152 attaching connecting plate 1146 to parachute 1154. Cords 1156 connect parachute 1154 to movable mass 1104. Parachute 1154 may be dimensioned based on the diameter of well 1102, and may have a maximum diameter of the well diameter. The parachute 1154 may slow the descent of movable mass 1104 and, once the movable mass 1104 reaches the bottom of the well 1102, the cords 1152 and 1156 and parachute 1154 may collapse on to the movable mass 1104.

Figure 12B:
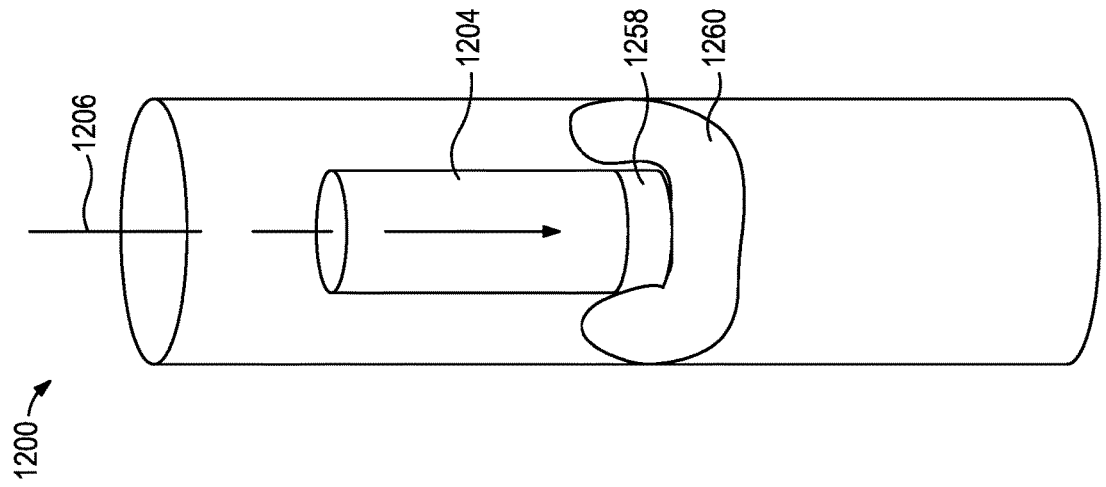
FIGS. 12A-12B are various views of a portion of a potential energy conversion system incorporating a movable mass equipped with an inflatable structure for protecting a well plug.
Figure 12A:
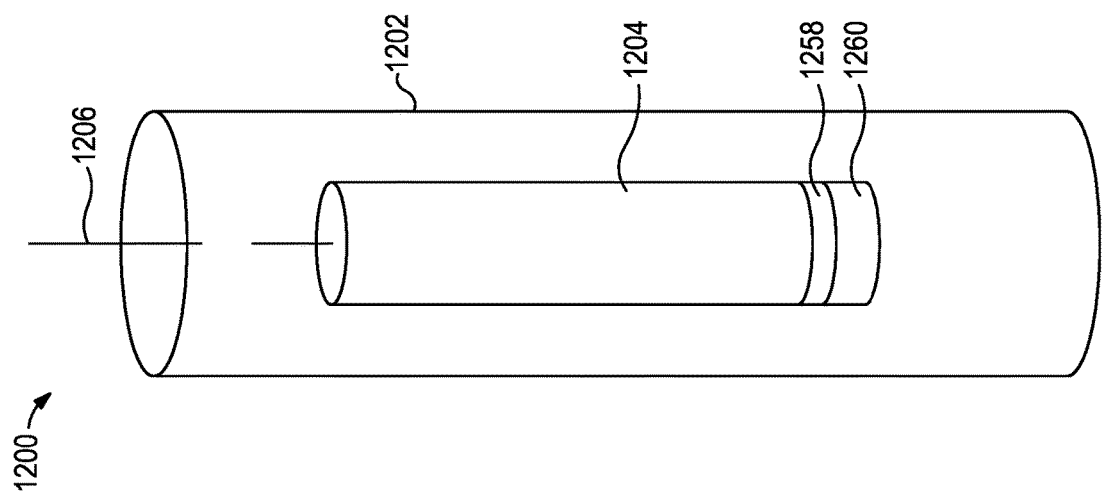

FIGS. 12A and 12B are various views of a portion of a potential energy conversion system 1200 incorporating a mass equipped with an inflatable structure for protecting a plug of a well. Potential energy conversion system 1200 includes a movable mass 1204 supported by line 1206 within an interval of well 1202. In this example, an inflatable structure 1260, such as an inflatable bag, is used to increase the diameter and fluid drag of movable mass 1204 during an uncontrolled fall. In the non-deployed state depicted in FIG. 12A, a inflatable structure 1260 is arranged on movable mass 1204 and interposed by a housing 1258 disposed over a pressure source capable of inflating inflatable structure 1260, such as a pressurized air vessel. In FIG. 12B, inflatable structure 1260 is deployed and inflated by pressurized gas supplied from housing 1258. When deployed, inflatable structure 1260 may increase fluid drag force, friction force, and buoyant force exerted on movable mass 1204 as it descends in well 1202. Inflatable structure 1260, once deployed, may also provide a lifting force from the buoyancy of gas filling the inflatable structure 1260. As the inflatable structure 1260 expands, it may be dimensioned to contact with the walls of well 1202, thereby providing additional kinetic friction force to slow the descent of the mass 1204. Inflatable structure 1260 may also cushion the impact and/or collapse upon contacting a plug within the well 1202.

Potential energy storage systems disclosed herein may also include one or more sub-systems for promoting recovery of a mass located at the base of a well following line failure. FIGS. 13A-13E are various views of a recovery system and method for retrieving a mass from a well housing a potential energy conversion system in accordance with the present disclosure. As shown in FIG. 13A, a movable mass 1304 equipped with a fishing neck 1362 is shown resting at the base of a well 1302. During retrieval, a grapple tool 1364 is lowered into well 1302 and is secured to fishing neck 1362, as shown in FIG. 13B. Depending on the weight of movable mass 1304, a line 1366 may be sufficient to withdraw mass 1304 from the well 1302.

However, for heavier or lodged movable masses 1304, inflatable devices may be employed to aid lifting and removal. As shown in FIG. 13C, grapple tool 1364 may be released from support line 1366. A balloon housing 1368 may then be lowered on a capillary string 1370 and installed on a corresponding coupling 1372 extending from grapple tool 1364. To aid withdrawal of movable mass 1304, gas is injected by capillary string 1370 to inflate and release balloon 1374 from balloon housing 1368, as shown in FIG. 13D. Fully inflated balloon 1374 then creates positive buoyancy that may lift or substantially aid removal of movable mass 1304. In FIG. 13E, a support line 1306 is re-attached to the movable mass 1304 by a connection at the top of balloon 1374. Balloon 1374 then provides buoyant force that aids removal of mass 1304 to the surface.

Embodiments disclosed herein include:

A. Potential energy conversion systems comprising: a movable mass suspended by a line in a non-producing well, the line being coupled to a motor operable to lift the movable mass, and a generator operable to produce electricity when lowering the movable mass B. Energy conversion methods comprising: providing the potential energy conversion system of A; and storing potential energy by raising the movable mass, or releasing potential energy and converting the potential energy to electricity by lowering the movable mass.

Each of embodiments A and B may have one or more of the following additional elements in any combination:

Element 1: wherein the non-producing well is cased.

Element 2: wherein the non-producing well is substantially vertical in a section where the movable mass is located.

Element 3: wherein a plug isolates an upper section of the non-producing well from a lower section of the non-producing well, the movable mass being located in the upper section of the non-producing well.

Element 4: wherein the line extends through a sheave pulley system located at an entry to the non-producing well.

Element 5: wherein the non-producing well is at least partially filled with a fluid.

Element 6: wherein the system further comprises a sensor operative to measure one or more fluid properties, gas properties, or any combination thereof within the non-producing well.

Element 7: wherein the sensor measures one or more quantities selected from the group consisting of fluid column height, pressure, density, redox potential, viscosity, hydrocarbon concentration, total dissolved solids, saline concentration, and any combination thereof.

Element 8: wherein the sensor is configured to remain on a surface of the fluid.

Element 9: wherein the sensor is coupled to a buoy or float effective for maintaining the sensor upon the surface of the fluid.

Element 10: wherein the system further comprises a range detector effective to determine a distance between a wellhead of the non-producing well and the buoy or float.

Element 11: wherein the system further comprises a range detector effective to determine a distance between a wellhead of the non-producing well and the movable mass.

Element 12: wherein the system further comprises a fluid trap for sampling fluid located at a wellhead of the non-producing well.

Element 13: wherein the motor operates as the generator as the movable mass is lowered and the motor turns in reverse.

Element 14: wherein the system further comprises one or more failsafe devices affixed to the movable mass or located upon a plug within the non-producing well, the plug isolating an upper section of the non-producing well from a lower section of the non-producing well, and the movable mass being located in the upper section of the non-producing well.

Element 15: wherein the one or more failsafe devices are effective to perform one or more of increasing buoyancy, increasing drag, or increasing friction of the movable mass.

Element 16: wherein the one or more failsafe devices comprises at least one of a spring, a magnet, a collapsible structure, an inflatable structure, a parachute, a flapper, or any combination thereof.

Element 17: wherein the one or more failsafe devices comprises one or more flappers, one or more parachutes, one or more balloons, or any combination thereof.

Element 18: wherein the system further comprises a recovery sub-system effective to retrieve a movable mass that becomes uncoupled from the line.

Element 19: wherein the non-producing well is at least partially filled with a fluid.

Element 20: wherein the method further comprises measuring one or more fluid properties in the non-producing well using a sensor coupled to a buoy or float effective for maintaining the sensor upon a surface of the fluid.

Element 21: wherein the method further comprises collecting a sample of the fluid using a fluid trap present at a wellhead of the non-producing well.

By way of non-limiting example, exemplary combinations applicable to A and B include, but are not limited to, 1 and any one or more of 2 to 21; 2 and any one or more of 1 and 3 to 21; 3 and any one or more of 1 to 2 and 4 to 21; 4 and any one or more of 1 to 3 and 5 to 21; 5 and any one or more of 1 to 4 and 6 to 21; 6 and any one or more of 1 to 5 and 7 to 21; 7 and any one or more of 1 to 6 and 8 to 21; 8 and any one or more of 1 to 7 and 9 to 21; 9 and any one or more of 1 to 8 and 10 to 21; 10 and any one or more of 1 to 9 and 11 to 21; 11 and any one or more of 1 to 10 and 12 to 21; 12 and any one or more of 1 to 11 and 13 to 21; 13 and any one or more of 1 to 12 and 14 to 21; 14 and any one or more of 1 to 13 and 15 to 21; 15 and any one or more of 1 to 14 and 16 to 21; 16 and any one or more of 1 to 15 and 17 to 21; 17 and any one or more of 1 to 16 and 18 to 21; 18 and any one or more of 1 to 17 and 19 to 21; 19 and any one or more of 1 to 18 and 20 to 21; 20 and any one or more of 1 to 19 and 21 to 21; 21 and any one or more of 1 to 20. Additional combinations applicable to A and B include, but are not limited to: 1 and 2; 1 and 3; 1 and 4; 1 and 5; 1 and 13; 2 and 3; 2 and 4; 2 and 5; 2 and 13; 3 and 4; 3 and 5; 3 and 13; 4 and 5; 4 and 13; 5 and 13; 1, 2, 3, 4, 5 or 13, and 6; 1, 2, 3, 4, 5 or 13, and 6 and 7; 1, 2, 3, 4, 5 or 13, and 6 and 8; 1, 2, 3, 4, 5 or 13, and 6 and 9; 1, 2, 3, 4, 5 or 13, and 10; 1, 2, 3, 4, 5 or 13, and 11; 1, 2, 3, 4, 5 or 13, and 12; 1, 2, 3, 4, 5 or 13, and 14; 1, 2, 3, 4, 5 or 13, and 14 and 15; 1, 2, 3, 4, 5 or 13, and 14 and 16; 1, 2, 3, 4, 5 or 13, and 14 and 17; and 1, 2, 3, 4, 5 or 13, and 18.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A potential energy conversion system comprising:
a movable mass suspended by a line in a non-producing well having a casing, an upper section, a lower section, and a plug isolating the upper section from the lower section, the movable mass being located in the upper section within a cased interval of the non-producing well, and the line being coupled to a motor operable to lift the movable mass and a generator operable to produce electricity when lowering the movable mass; wherein the potential energy conversion system comprises at least one of 1) a sensor located within the upper section of the non-producing well and operative to measure one or more fluid properties, gas properties, or any combination thereof within the upper section of the non-producing well, 2) one or more failsafe devices affixed to the movable mass or located upon the plug within the non-producing well, 3) a range finder effective to determine a distance between a wellhead of the non-producing well and the movable mass, the wellhead comprising a blowout preventer, or 4) any combination thereof.

2. The potential energy conversion system of claim 1, wherein the cased interval extends between the wellhead and the plug.

3. The potential energy conversion system of claim 1, wherein the non-producing well is substantially vertical in the upper section where the movable mass is located.

4. The potential energy conversion system of claim 1, wherein the line extends through a sheave pulley system located at an entry to the non-producing well.

5. The potential energy conversion system of claim 1, wherein the upper section of the non-producing well is at least partially filled with a fluid.

6. The potential energy conversion system of claim 5, wherein the fluid is an aqueous fluid comprising a nanosodium silicate.

7. The potential energy conversion system of claim 5, wherein the fluid is an aqueous fluid comprising one or more additives selected from the group consisting of a biocide, an anti-corrosion chemical, a scale inhibitor, a friction reducer, a rheology modifier, and any combination thereof.

8. The potential energy conversion system of claim 1, wherein an annulus separates the movable mass from the casing, the annulus being 6 inches or less in size.

9. The potential energy conversion system of claim 1, wherein the motor operates as the generator as the movable mass is lowered and the motor turns in reverse.

10. The potential energy conversion system of claim 1, further comprising:
a recovery sub-system effective to retrieve the movable mass from a base of the non-producing well, if the movable mass becomes uncoupled from the line or the line fails.

11. The potential energy conversion system of claim 1, wherein the plug is located above an interval containing a plurality of perforations in the lower section of the non-producing well.

12. The potential energy conversion system of claim 1, further comprising:
a fluid trap for sampling fluid located at the wellhead of the non-producing well.

13. An energy conversion method comprising:
providing the potential energy conversion system of claim 1; and
storing potential energy by raising the movable mass, or releasing potential energy and converting the potential energy to electricity by lowering the movable mass.

14. The method of claim 13, wherein the upper section of the non-producing well is at least partially filled with a fluid.

15. The method of claim 14, further comprising:
measuring one or more fluid properties in the upper section of the non-producing well using the sensor and the sensor being coupled to a buoy or float effective for maintaining the sensor upon a surface of the fluid.

16. The method of claim 14, further comprising:
collecting a sample of the fluid using a fluid trap present at the wellhead of the non-producing well.

17. The potential energy conversion system of claim 1, further comprising a monitoring sub-system comprising the sensor, wherein:
the sensor is located upon a buoy effective to float upon a fluid in the upper section of the non-producing well,
the sensor is a range finder and the monitoring sub-system comprises one or more reflective targets,
the sensor is a Hall effect sensor and the monitoring sub-system comprises a magnet,
the sensor is a pressure sensor,
the sensor is a flow meter,
the sensor is located upon the movable mass, or
any combination thereof.

18. A potential energy conversion system comprising:
a movable mass suspended by a line in a non-producing well having a casing, an upper section, a lower section, and a plug isolating the upper section from the lower section, the movable mass being located in the upper section within a cased interval of the non-producing well, and the line being coupled to a motor operable to lift the movable mass and a generator operable to produce electricity when lowering the movable mass;
wherein the upper section of the non-producing well is at least partially filled with a fluid, the potential energy conversion system comprises a sensor operative to measure one or more fluid properties, gas properties, or any combination thereof within the upper section of the non-producing well, and the sensor is configured to remain on a surface of the fluid.

19. The potential energy conversion system of claim 18, wherein the sensor measures one or more quantities selected from the group consisting of fluid column height, pressure, density, redox potential, viscosity, hydrocarbon concentration, total dissolved solids, saline concentration, and any combination thereof.

20. The potential energy conversion system of claim 18, wherein the sensor is coupled to a buoy or float effective for maintaining the sensor upon the surface of the fluid.

21. The potential energy conversion system of claim 20, further comprising:
a range finder effective to determine a distance between a wellhead of the non-producing well and the buoy or float, the wellhead comprising a blowout preventer.

22. An energy conversion method comprising:
providing the potential energy conversion system of claim 18; and
storing potential energy by raising the movable mass, or releasing potential energy and converting the potential energy to electricity by lowering the movable mass.

23. The energy conversion method of claim 22, further comprising:
measuring one or more fluid properties, gas properties, or any combination thereof within the upper section of the non-producing well.

24. A potential energy conversion system comprising:
a movable mass suspended by a line in a non-producing well having a casing, an upper section, a lower section, and a plug isolating the upper section from the lower section, the movable mass being located in the upper section within a cased interval of the non-producing well, and the line being coupled to a motor operable to lift the movable mass and a generator operable to produce electricity when lowering the movable mass;
wherein the potential energy conversion system comprises one or more failsafe devices affixed to the movable mass or located upon the plug within the non-producing well.

25. The potential energy conversion system of claim 24, wherein the one or more failsafe devices are effective to perform one or more of increasing buoyancy, increasing drag, or increasing friction of the movable mass.

26. The potential energy conversion system of claim 25, wherein the one or more failsafe devices comprise one or more flappers, one or more parachutes, one or more balloons, or any combination thereof.

27. The potential energy conversion system of claim 24, wherein the one or more failsafe devices comprise at least one of a compression spring, a magnet, a collapsible structure, an inflatable structure, a parachute, a flapper, or any combination thereof.

28. An energy conversion method comprising:
providing the potential energy conversion system of claim 24; and
storing potential energy by raising the movable mass, or releasing potential energy and converting the potential energy to electricity by lowering the movable mass.

* * * * *

UNITED STATES PATENT AND TRADEMARK OFFICE
CERTIFICATE OF CORRECTION

| | |
|---|---|
| PATENT NO. | : 11,492,874 B2 |
| APPLICATION NO. | : 17/523143 |
| DATED | : November 8, 2022 |
| INVENTOR(S) | : Walker Rowley Colt, Anthony Kemp Gregory and Stefan James Strekfus |

It is certified that error appears in the above-identified patent and that said Letters Patent is hereby corrected as shown below:

On the Title Page

The inventor name Walter Rowley COLT should instead read Walker Rowley Colt.

Signed and Sealed this
Thirty-first Day of January, 2023

Katherine Kelly Vidal
*Director of the United States Patent and Trademark Office*